Dec. 29, 1964 J. J. GILBERT 3,163,684
GAS DIFFUSION APPARATUS
Filed Dec. 22, 1961 2 Sheets-Sheet 2

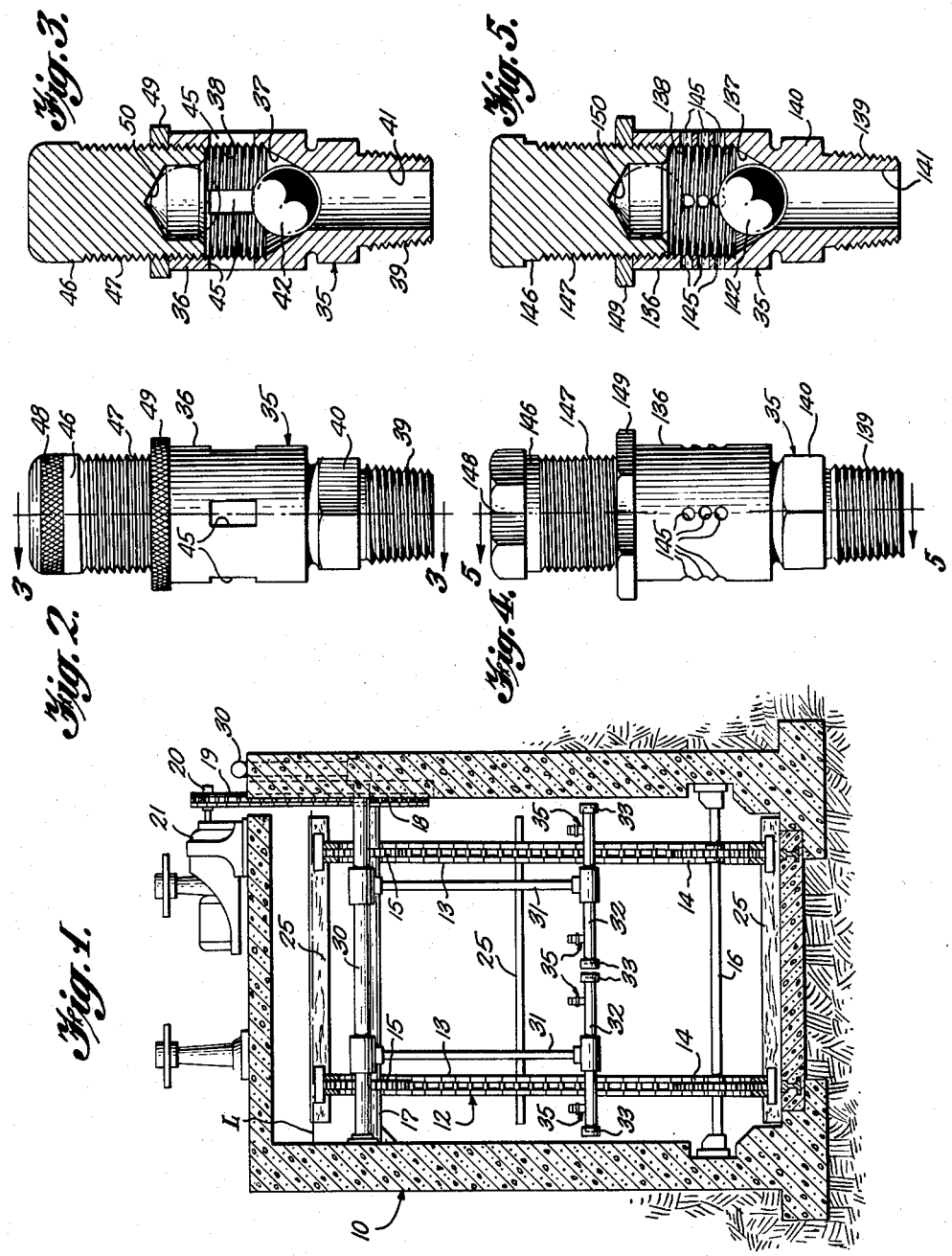

INVENTOR
Joseph J. Gilbert

United States Patent Office 3,163,684
Patented Dec. 29, 1964

3,163,684
GAS DIFFUSION APPARATUS
Joseph J. Gilbert, Abington, Pa., assignor to Link-Belt Company, a corporation of Illinois
Filed Dec. 22, 1961, Ser. No. 161,606
5 Claims. (Cl. 261—42)

This invention relates generally to the art of diffusing gas into a liquid. The invention finds particular application in the aeration treatment of sewage, industrial wastes, etc., as such treatment is carried out, for example, in pre-aeration, grit removal, channel aeration or in the activated sludge process. Specifically, the instant invention relates to an improved diffuser and system employing this diffuser for use in introducing a gas into a liquid confined in a treatment chamber.

Considering by way of example the treatment of sewage, it is often necessary in such treatment to dissolve large quantities of air or oxygen in the sewage and at the same time agitate the sewage to flocculate the solids therein and provide sufficient mixing of the gas and liquid. Heretofore it has been common to provide porous diffusion members near the bottom of a tank of sewage and force air through these porous members into the sewage. The rising air bubbles agitate the sewage as well as aerate it. This method of aeration is expensive in as much as considerable power is required to compress the air sufficiently to overcome the liquid head above the porous members, and force the air through the porous members to achieve adequate aeration.

The porous members are frequently made of ceramic material having a large number of relatively minute openings through which the gas is discharged for diffusion into the liquid. Because of these minute openings, the gas must be thoroughly filtered or cleaner prior to reaching the diffuser member to avoid clogging of the very fine pores.

The use of porous members has a further drawback in that such members gradually become clogged, as for example, by the build-up of algae growth thereon so that substantial maintenance costs arise due to the necessity for repeated cleanings of the porous members and requirement that the sewage treatment plant must be shut down for extended periods during such cleanings.

Diffusers for sewage aeration having individual orifices through which the gas is discharged into the liquid to be aerated have also been proposed in various forms. For the most part, diffusers of this type have the disadvantage that the gas is discharged into the liquid in successive large bubbles with the result that the gas is not effectively distributed through the liquid particularly at levels close to the orifices. Moreover, the liquid contains certain solids and particles which tend to be forced into the submerged gas conduit by the liquid pressure whenever the gas is shut off. Eventually, these solids clog the orifice or orifices with the result that it is necessary to clean the diffuser by either removal from the tank or by draining the tank and cleaning the diffuser in place.

In sewage treatment operations, diffusion of air into a liquid is most effective both for oxidation and circulating the tank contents when the air is introduced in a continuous pattern of small bubbles. For a given quantity of gas, the smaller the bubbles, the larger is the exposed surface area and hence the larger is the gas liquid interface. Furthermore, a continuous and uniform pattern of bubbles develops a more desirable and uniform recirculation of the tank contents.

Most recently developed sewage aeration devices include plates or tubes of ceramic bonded aluminum oxide or plastic cloth or plastic covered frames of various shapes and sizes adapted to emit a controlled pattern of bubbles. These devices are unduly complicated and costly in achieving their objective of producing a desired bubble pattern. Also, they are subject to the numerous mechanical failures mentioned above such as internal orifice clogging, debris accumulation, breakage, etc., so that frequent repair and replacement of such devices is required. The contemplated frequency of operational failure of these devices is evidenced by the development of the so-called swing type diffusers which permit the diffuser to be removed from the tank for repair or replacement without draining the tank. In any event, the prior art diffusers have no capacity for adjustment to accommodate gas flow rates selected to meet the specific needs of the particular aeration installation.

It is a principal object of the invention to provide an improved system for introducing gas into a liquid confined in a treatment chamber as for the purpose of aerating the liquid.

It is another principal object of the instant invention to provide a simple and rugged diffuser for use in diffusing gas into a liquid and which diffuser is readily adjustable to accommodate various rates of gas flow for different gas diffusing requirements of various installations.

It is a further object of the instant invention to provide a diffuser for introducing gas into a liquid in accordance with the preceding object and wherein reverse flow of liquid through the diffuser upon termination of the flow of gas through the diffuser is prevented.

It is also an object of the instant invention to provide a diffuser for use in introducing gas into a liquid wherein the diffuser includes a body defining a cavity with a series of separate apertures extending outwardly from the cavity and adjusting means mounted on the body to be movable to restrict or close the apertures to reduce the area for gas flow from the cavity to the exterior of the diffuser and wherein the cavity contains a check valve member operable to preclude reverse flow of liquid through the diffuser upon terminating flow of the gas.

The above and other more specific objects and novel features of the instant invention will be apparent from the following description taken in conjunction with the accompanying drawings. It is to be expressly understood, however, that the drawings are for the purpose of illustration only and are not intended to define the limits of the invention, but rather to merely illustrate a preferred embodiment and structure incorporating the features of the instant invention.

In the accompanying drawings forming a part of this specification and wherein like reference characters are employed to designate like parts throughout the several views:

FIGURE 1 is a cross-sectional view showing the gas diffusing system and diffuser of the instant invention mounted in relation to a conventional type of tank used in sewage treatment;

FIGURE 2 is a side elevational view of one form of diffuser made in accordance with the instant invention;

FIGURE 3 is a sectional view taken on line 3—3 of FIGURE 2;

FIGURE 4 is a side elevational view of another form of diffuser made in accordance with the instant invention;

FIGURE 5 is a sectional view taken on line 4—4 of FIGURE 4;

Figure 6:
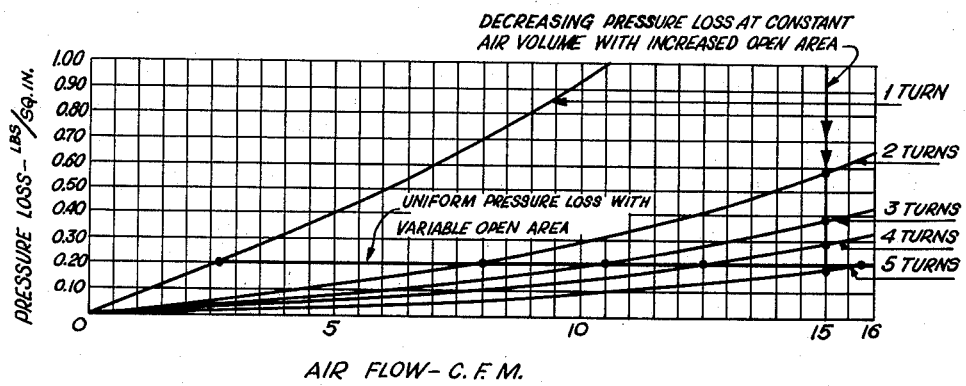
FIGURE 6 is a graph illustrating the pressure loss-air flow relationship for various adjusted positions of the diffuser form of FIGURES 2 and 3.

The instant invention is shown in FIGURE 1 in operative relation to a more or less typical sewage aeration and settling tank wherein the liquid within the tank is aerated and sludge settles to and is removed from the bottom of the tank. A typical construction of aeration and settling tank such as commercially available from the Link-Belt Company is illustrated in cross-section in FIGURE 1 on the drawing. It will be appreciated that the particular construction or form of the aeration and settling tank as well as the sludge collectors shown associated therewith are only for purposes of illustration and that the aeration system and diffuser of the instant invention may be employed in enumerable tank constructions and with a variety of aeration systems other than as illustrated on the drawing.

An aeration tank 10, constructed to retain a body of liquid to be aerated with the liquid level maintained to the line L is shown on FIGURE 1. In the particular embodiment illustrated, a sludge collector 12 comprised of parallel chains 13 passing around lower sprockets 14 and upper sprockets 15 is mounted within tank 10. Sprockets 14 are mounted on a shaft 16 and sprockets 15 mounted on a shaft 17, such shafts being rotatably supported to extend parallel to each other and span between the side walls of tank 10.

Shaft 17 carries a drive sprocket 18 driven by a chain 19 engaged with a sprocket 20 on the drive shaft of a suitable drive assembly 21 which may include a speed reducer and an electric motor. The chains 13 pass along the bottom of the tank 10 and carry transverse collector flights 25. As is well known, the collector functions to move the flights 25 along the bottom of the tank and thereby remove the sludge to a sludge hopper located at one end of the tank or adjacent the end of the path of travel of the collector chains 13. The construction of the collector and its operation forms no part of the instant invention and is illustrated only by way of background to set forth the interrelationship of the aeration system and diffusers of this invention to a conventional aeration and settling tank.

A pipe 30 for gas under pressure to be used in carrying out the diffusion of gas into the liquid within tank 10 extends across the tank. This pipe supports and communicates with downwardly extending pipes 31 which convey the gas to the horizontally extending conduits 32, one of such conduits being mounted on the lower end of each pipe. If desired, the pipes 31 may be swing mounted on pipe 30 to facilitate swinging conduits 32 out of the tank above the level L of the liquid when the diffuser may be adjusted to meet changed operating needs or cleaned when and if necessary.

The ends of conduits 32 are closed by suitable caps 33 and each conduit carries a plurality of diffusers 35 which extend upwardly from the upper face of the conduit to be upstanding relative to the horizontal position of the conduits 32. Although each conduit 32 has been shown with two diffusers 35 mounted thereon, it will be understood that any desired number of upstanding diffusers 35 may be provided as may be appropriate dependent on the length of the conduit 32, the spacing deemed necessary to achieve the desired rate of gas diffusion into the liquid within tank 10, the volume of gas to be diffused into the liquid and other factors which may be different for different installations where the diffusers are to be used. The diffusers 35 may take the form either as shown in FIGURES 2 and 3 or FIGURES 4 and 5 and the reference numeral 35 is used herein to generally designate a diffuser of the type having the characteristics common to the illustrated embodiments.

It is important to note that in the aeration system of this invention, the conduit 32 mounted on the lower end of each pipe 31 is submerged within the liquid in tank 10 such that a head of liquid exists above the level of the diffusers 35 supported on each conduit. It is also significant that, as shown in FIGURE 1, the diffusers are positioned in an upstanding state to be properly operable as will be apparent from the description given hereinafter.

Reference may now be had to the particular construction of the diffuser as shown in FIGURES 2 and 3 and to the operating characteristics of such a diffuser as represented by the graph of FIGURE 6.

The diffuser 35 as shown in FIGURES 2 and 3 includes a body 36. A cavity 37 is formed in body 36 with the cavity being internally threaded at 38 and opening through the upper end of the body as shown in FIGURE 3. The shank end 39 of body 36 is externally threaded to provide means for mounting the diffuser in a taped hole on the gas conduit 32. The body may be provided with an appropriate hexagonal cross-sectional portion 40 to facilitate the use of a wrench in mounting the diffuser on conduit 32. A passage 41 extends through the externally threaded shank end 39 of body 36 such passage opening into cavity 37. As shown in FIGURE 3, cavity 37 has a somewhat larger internal diameter than the diameter of passage 41.

As mounted on conduit 32, the diffuser 35 is supplied with gas from the conduit, such gas passing upwardly through passage 41 and into cavity 37. A check valve member in the form of a ball 42 is positioned in cavity 37. Ball 42 is freely movable within the cavity and in the properly mounted upstanding relation of the diffuser 35 will fall by gravity to the position shown in FIGURE 3 where it closes the passage 41, thereby preventing flow of liquid downwardly through the passage and into conduit 32 as might occur when gas flow is cut off and pressure within conduit 32 is relieved.

In the embodiment of FIGURES 2 and 3, the walls of cavity 37 are provided with a series of elongated rectangular apertures 45 which extend outwardly from the cavity to the exterior of body 36. These apertures 45 accommodate flow of gas from cavity 37 as supplied to the cavity through passage 41. As gas leaves the apertures 45, it forms into discrete bubbles within the liquid in which the diffuser 35 is immersed.

A flow adjusting bolt 46 having an externally threaded portion 47 is threaded into the open end of cavity 37 mating with the threads 38 on the interior of the cavity. This bolt may have a knurled upper end 48 by means of which it can readily be turned to adjust its position in opening or closing apertures 45. A lock nut ring 49, also shown with a knurled outer surface, is threaded onto bolt 46 to retain the desired setting of bolt 46 by the ring being turned down against the upper end of body 36. Although a knurled outer surface is shown provided at 48 on bolt 46 and on the exterior of ring 49, it will be appreciated that the knurling may be replaced with a hexagonal wrench engageable portion such as illustrated on the diffuser form shown in FIGURES 4 and 5.

The end of bolt 46 disposed within cavity 37 is shown with a pocket 50 formed therein. This pocket may be provided to accommodate the check valve ball 42 in the position shown in phantom on FIGURE 3, a position that ball 42 will assume while gas is flowing into cavity 37 through passage 41 from gas conduit 32.

It will be appreciated that by adjusting the position of bolt 46 as by threading it into or out of cavity 37, the lower end portion of the bolt will cover a greater or lesser portion of the apertures 45. With bolt 46 fully threaded into cavity 37, the apertures 45 will be completely closed. As the bolt is backed out of the cavity by rotating it through successive turns, an increasingly greater amount of the area of the apertures 45 will be uncovered and thus a greater flow area for the gas to be diffused into the surrounding liquid will be provided.

As an important part of the instant invention, it has been found that the diffusers 35 may be adjusted to accommodate the desired gas flow volume for effective diffusion of the gas into liquid while maintaining the pressure loss and consequent energy input to achieve aeration at a reasonably low level. Where the flow velocity through the diffuser apertures is maintained sufficiently high, the diffuser tends to be self-cleaning, i.e., build up of algae growth and other obstruction to flow through the apertures is minimized. It is, of course, desirable to maintain the diffuser apertures open, free from clogging as this is one of the principal drawbacks necessitating frequent cleaning of diffusers in the prior art. Thus, the adjustability of the diffusers enables them to be set for greater gas flow volumes as may be necessary with increased volume of liquid to be treated or with liquids necessitating greater aeration, such adjustment being feasible without increasing the pressure loss through the diffusers and encountering the increased energy loss which would arise if previously available nonadjustable diffuser constructions were to be used.

Referring to the graph of FIGURE 6, increments of pressure loss in pounds per square inch are plotted against various air flows in cubic feet per minute. The pressure loss refers to the pressure difference which will exist between the exterior and interior of the diffuser while the air flow has reference to the rate of gas flow through the diffuser. The five curves shown on this graph reflect the relationship which will exist between pressure loss and air flow for five different settings of the adjusting bolt 46 relative to the apertures 45.

Taking for example, the curves designated "2 Turns," this curve contemplates that the diffuser adjusting bolt 46 has been backed out of cavity 37 two full 360° turns commencing from a point where the inner end of the bolt 46 is disposed so that it completely blocks the four apertures 45. With this setting of the diffuser, it will be seen that a pressure loss of 0.2 pound per square inch occurs with an air flow of eight cubic feet per minute. If the air flow is increased to 15 cubic feet per minute, the pressure loss with this same setting of the diffuser increases to just less than 0.6 pound per square inch.

By means of the graph of FIGURE 6 as applicable to the diffuser shown in FIGURES 2 and 3, the necessary setting for a diffuser may be determined. For example, if a pressure loss of 0.2 pound per square inch is the maximum that can be tolerated, the horizontal line identified "Uniform Pressure Loss With Variable Open Area" indicates how a computation can be made as to the diffuser setting necessary to accommodate the desired air flow rate and not exceed this pressure loss figure. With this pressure loss of 0.2 pound per square inch and if an air flow of eight cubic feet per minute is desired, the bolt 46 should be backed out two turns; for an air flow of 10½ cubic feet per minute, the bolt should be backed out three turns; for a 12½ cubic feet per minute air flow, the bolt should be backed out four turns and with the bolt backed out five turns, the air flow through the diffuser would be between 15½ and 16 cubic feet per minute. Of course, for other permissible pressure loss figures, it will be appreciated that a horizontal line on the graph through the pressure loss figure that can be tolerated in the installation will indicate the air flow rates for various settings of the diffuser where the horizontal line intersects the curves for the various openings of the diffuser.

The vertical line on the graph of FIGURE 6 entitled "Decreasing Pressure Loss at Constant Air Volume With Increased Open Area" exemplifies how for a particular desired air flow rate the pressure loss for different settings of the diffuser may be determined. Thus, where in a particular gas-liquid diffusion problem, it is determined that a certain number of cubic feet of air need be introduced to achieve proper aeration or treatment of the liquid, the adjustment of the diffuser 35 by manipulation of bolt 46 may be performed and the accompanying pressure loss which can be expected to exist for this gas flow rate through the diffuser determined from the graph. Conversely, the permissible pressure loss maximum can be used together with the needed gas flow rate to determine from the graph of FIGURE 6 the minimum permissible opening setting for the diffuser.

Figure 7:
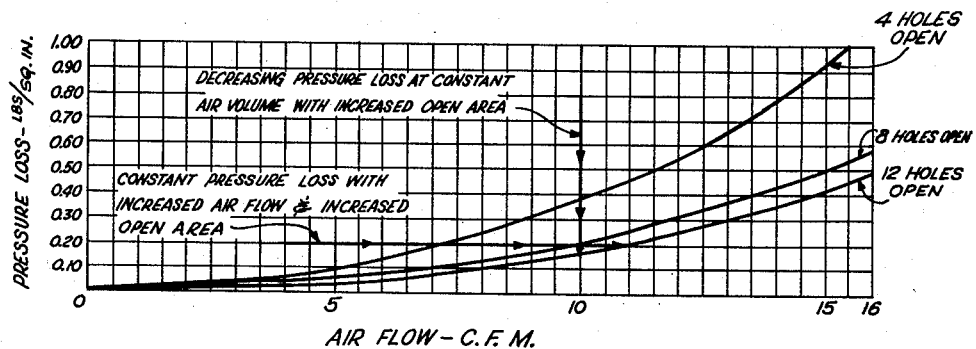
FIGURE 7 is a graph illustrating the pressure loss-air flow relationship for various adjusted positions of the diffuser form of FIGURES 4 and 5.

FIGURES 4 and 5 and the graph of FIGURE 7 relate to a modified construction for diffuser 35. To facilitate identification of the elements of the diffuser illustrated on FIGURES 4 and 5, reference numerals comparable to those used in describing the embodiment of FIGURES 2 and 3 will be employed with the digit 1 as a prefix.

The diffuser shown in FIGURES 4 and 5 includes a body 136 having a cavity 137 which opens through the upper end of the body 136 as shown in FIGURE 5 and is internally threaded at 138. The shank end 139 of body 136 is externally threaded to provide means for mounting the diffuser on and in communication with conduit 32. A suitable hexagonal wrench engageable portion 140 may be provided on the body 136 to facilitate applying the diffuser on conduit 32. The externally threaded portion of body 136 is provided with a passageway 141 extending therethrough and opening into the cavity 137.

A check valve ball 142 is disposed within cavity 137. Ball 142 is freely movable within the cavity and in the properly mounted upright position of diffuser 35 the ball assumes the position as shown in FIGURE 5 in which it closes passage 141. In use of the diffuser, the closing of passage 141 by ball 142 is effective when gas is not flowing through conduit 32. Accordingly, the ball prevents reverse flow of liquid which surrounds the diffuser into conduit 32.

The walls of the cavity 137 are provided with a series of rows of apertures 145. As shown in FIGURES 4 and 5, there are four rows, each row containing three apertures with the rows extending parallel to each other and at spaced positions around the circumference of the cylindrical body 136. The apertures 145 extend from the cavity 137 outwardly to the exterior of body 136.

An adjusting bolt 146 having an externally threaded portion 147 is threaded into the cavity 137 cooperating with the threads 138 in such cavity. As illustrated, the upper end of bolt 136 is provided with a hexagonal head 148 which may be engaged by a wrench for turning the bolt in affecting its adjustment relative to body 136. A lock nut ring 149 is threaded onto the threads 147 of bolt 146. This ring is formed with a hexagonal external cross-section to permit its being engaged with a wrench whereby, once the bolt 146 is adjusted to the desired position, the lock ring 149 may be tightened down against the body 136 to lock the bolt 146 in this position.

A pocket 150 is provided in the end of bolt 146 that is disposed in cavity 137. This pocket accommodates the check valve ball 142 in the manner as shown in phantom on FIGURE 5. It will be appreciated that upon flow of gas through conduit 32 which mounts diffuser 35 and flow of this gas upwardly through passage 141, the ball will be lifted from its seat and forced upwardly into pocket 150. The flowing gas enters chamber 137 and exits through the apertures 145 or portions thereof that are not covered by the end of bolt 146.

As shown in FIGURE 5, the bolt 146 is backed out of cavity 137 so that all of the apertures 145 are uncovered, i.e. 12 apertures are open for flow of gas outwardly from cavity 137 into the liquid surrounding the diffuser. By releasing lock ring 149, the bolt 146 may be threaded into cavity 137 to points where it closes some or all of the apertures 145. Thus, by adjusting the position of the bolt relative to body 136, a greater or lesser number of apertures 145 may be blocked or any desired portion of the apertured area may be blocked to vary the gas flow area through which gas can be expelled into the liquid surrounding the diffuser.

By reference to the graph of FIGURE 7 as applicable to the diffuser of FIGURES 4 and 5 and which graph is similar to the above-described graph of FIGURE 6, the relationship between air flow and pressure loss for different adjusted settings of the bolt 146 relative to the apertures 145 in the walls of cavity 147 may be determined. The three curves shown on this graph represent, as identified by the legends thereon, the pressure loss-air flow relationship when the diffuser 35 of FIGURES 4 and 5 is adjusted to have "4 Holes Open," "8 Holes Open" and "12 Holes Open."

Similar to the description above with reference to FIGURE 6, the horizontal line on the graph of FIGURE 7 is illustrative of the manner in which increased air flow may be obtained for increased aeration while maintaining a constant pressure loss across the diffuser. The particular constant pressure loss line shown on FIGURE 7 represents a constant pressures loss of 0.2 pound per square inch.

Also similar to the description given above for FIGURE 6, the vertical line on the graph of FIGURE 7 illustrates how decreased pressure loss may be obtained for a particular air flow rate by adjusting the bolt 146 to alter the air flow area of the apertures 145. The particular line shown represents a constant air flow of 10 cubic feet per minute.

It is to be understood that the form of this invention herewith shown and described is to be taken as a preferred example of the same, and that various changes in shape, size and arrangement of parts may be resorted to without departing from the spirit of the invention or the scope of the subjoined claims.

I claim:

1. In a system for diffusing a gas into a liquid, the combination of a chamber for confining a body of liquid, a source of gas under pressure, a conduit connected to said source for supplying gas under pressure, means for mounting said conduit horizontally in the lower portion of the chamber, a plurality of diffusers submerged in the liquid individually mounted at spaced positions along the length of said conduit, said diffusers being positioned to extend upwardly from the upper face of said conduit, each of said diffusers having wall means defining a cavity therein, means forming a gas passage within said diffuser extending from said conduit and opening into said cavity to conduct gas to said cavity, a check valve member freely movable within said cavity into and out of closing relation with said gas passage and movable by gravity into closing relation with said gas passage in the absence of gas flow from said conduit and thereby prevent flow of liquid from said chamber into said conduit, said wall means having threads formed on the inner surface thereof and having aperture means formed therein and extending outwardly therethrough from said cavity to the exterior of said diffuser, and a plug threaded into said wall means and selectively positionable relative to said aperture means to vary the flow area of said aperture means, said plug having a recess formed in its inner end to receive said check valve member when the latter is in its fully open position to thereby permit unrestricted flow of gas from said gas passage to said aperture means.

2. Apparatus for diffusing a gas into a liquid, comprising a liquid confining treatment chamber, a source of gas under pressure, a conduit connected to said source for supplying gas under pressure to the lower portion of the liquid in the chamber, a diffuser submerged in the liquid including a diffuser body having wall means defining a cylindrical cavity opening outwardly at one end of said body, means on said body for mounting the diffuser in communication with the conduit, said body having a gas passage formed therein extending from said cavity to communicate with the conduit to conduct gas to said cavity, a check valve member disposed within said cavity for free movement to open and close said passage, said check valve member being moved by gravity in the absence of gas flow from the gas conduit to close said passage and prevent flow of liquid from the chamber into the gas conduit, said wall means being threaded along the interior of said cylindrical cavity, a member threaded into said cavity and projecting outwardly of said diffuser body, the outwardly projecting portion of said member having an irregularly formed surface for engagement to selectively screw the member into and out of said cavity, said wall means having aperture means formed therein and extending therethrough from said cylindrical cavity to the exterior of said body, said member having a recess formed in its inner end to receive said check valve member when the latter is in its fully open position to thereby permit unrestricted flow of gas from said gas passage to said aperture means, movement of said member into and out of said cavity selectively positioning the member relative to said aperture means to vary the flow area of said aperture means, and means for retaining said member in a fixed selected position.

3. Apparatus as recited in claim 2 wherein said aperture means comprises a series of rectangular ports opening radially from said cylindrical cavity with said ports being spaced circumferentially around the perimeter of said cavity.

4. Apparatus as recited in claim 2 wherein said aperture means comprises a series of parallel rows of ports opening radially from said cylindrical cavity with said rows being spaced circumferentially around the perimeter of said cavity and each row containing a plurality of longitudinally spaced ports.

5. Apparatus as recited in claim 2 wherein said retaining means comprises a lock nut ring threaded onto said member and engageable with said one end of said body to lock said member against rotative movement.

References Cited in the file of this patent

UNITED STATES PATENTS

| 1,153,401 | Milne | Sept. 14, 1915 |
| 1,214,637 | Zistel | Feb. 6, 1917 |
| 1,861,982 | Schiller | June 7, 1932 |
| 2,322,017 | Hartman | June 15, 1943 |
| 2,986,382 | Langdon | May 30, 1961 |

FOREIGN PATENTS

| 667,228 | Great Britain | Feb. 27, 1952 |